United States Patent [19]
Griffin

[11] Patent Number: 6,048,927
[45] Date of Patent: Apr. 11, 2000

[54] METHOD FOR FORMING FIBER TREATING COMPOSITION COMPRISING AN AMIDE-FUNCTIONAL POLYORGANOSILOXANE AND AN ALKYLSULFATE OF BENZIMIDAZOLE

[75] Inventor: Howard Edwin Griffin, Greensboro, N.C.

[73] Assignee: Dow Corning Corporation, Midland, Mich.

[21] Appl. No.: 09/259,908

[22] Filed: Mar. 1, 1999

[51] Int. Cl.[7] ....................................................... C08K 5/35
[52] U.S. Cl. .......................... 524/719; 524/860; 524/868; 528/26; 528/27; 528/28; 8/189; 8/194; 8/DIG. 1; 252/8.81; 252/8.84; 252/8.85; 252/8.86; 252/8.63; 252/8.61
[58] Field of Search ..................................... 524/719, 860, 524/868; 528/26, 27, 28; 8/189, 194, DIG. 1; 252/8.81, 8.63, 8.61, 8.84, 8.85, 8.86

[56] References Cited

U.S. PATENT DOCUMENTS

| | | | |
|---|---|---|---|
| 4,268,670 | 5/1981 | Wehling et al. | 542/435 |
| 5,100,991 | 3/1992 | Cray et al. | 528/26 |
| 5,593,611 | 1/1997 | Czech | 252/8.63 |

OTHER PUBLICATIONS

Lautenschlager et al., "Structure Activity Relationships of Aminofuncitonal Siloxanes as Components in Softening Finishes,"; Textile Chemist and Colorist, vol. 27, No. 3, pp. 27–29, Mar. 1995.

*Primary Examiner*—Margaret G. Moore
*Attorney, Agent, or Firm*—William F. Boley

[57] ABSTRACT

A method for forming a fiber treating composition comprising contacting an aminofunctional polysiloxane comprising at least one aminofunctional siloxy unit with a mixture comprising a lactone and an alkylsulfate of benzimidazole thereby effecting formation of an amide-functional polysiloxane in admixture with the alkylsulfate of benzimidazole. The composition formed by the method is particularly useful for treating textiles such as cotton and cotton-synthetic blends to provide good softness and water absorbency and improved whiteness and treatment durability.

20 Claims, No Drawings

METHOD FOR FORMING FIBER TREATING COMPOSITION COMPRISING AN AMIDE-FUNCTIONAL POLYORGANOSILOXANE AND AN ALKYLSULFATE OF BENZIMIDAZOLE

BACKGROUND OF INVENTION

The present invention is a method for forming a fiber treating composition comprising contacting an aminofunctional polysiloxane comprising at least one aminofunctional siloxy unit with a mixture comprising a lactone and an alkylsulfate of benzimidazole. The compositions of the present method are especially useful for treating cotton fabrics and blend of cotton and synthetic fiber fabrics to impart good softness and water absorbency and improved whiteness and durability of the treatment.

It is known to treat fibrous materials such as textiles with polysiloxanes to impart desirable properties such as water repellency, lubricity, and crease resistance. It is also known to treat textiles with aminofunctional polydimethylsiloxanes, to provide for textiles having extremely soft hand, however such treatment typically results in a yellowing of the fabric. Czech, U.S. Pat. No. 5,593,611, describes a method for treating a textile to impart amine-like softness and reduced yellowing comprising treating a textile with an aminopolysiloxane having an amine content as —$NH_2$ ranging from about 0.15 to 0.25 percent by weight as —$NH_2$ and having a molecular weight of at least about 30,000 However, treatment with such aminofunctional polydimethylsiloxanes while providing for good softness typically cause some yellowing and lost of water absorbency of the treated textile.

Cray et al., U.S. Pat. No. 5,100,991, teach polydiorganosiloxanes having a group described by formula =NCO(CHR)$_n$OH connected with a silicon atom of a siloxane unit of the polydiorganosiloxane where R represents a hydrogen atom or an alkyl group and n has a value in the range of 2 to 7. Cray et al. teach that such amide substituted polyorganosiloxanes can be made by reaction between lactone and an amino substituted organosilicon compound. Lautenschlager et al., Textile Chemist and Colorist, Vol. 27, No. 3, p.27–29, teach that an aminosilicone partially acylated with butyrolactone when used to treat fabrics provides for improved softness, whiteness, water absorbency, and soil release characteristic for the fabric when compared to the fabric treated with standard aminosilicones.

Alkylsulfates of benzimidazole are known for their use as whiteners in the treatment of synthetic fibers such as acrylics. However, a problem with alkylsufates of benzimidazole is that they are a solid at room temperature, poorly soluble in polysiloxanes, and require a solvent to make them compatible with typical processes for treating fibers. The present inventor has discovered a simple one-step method for preparing amide-functional polysiloxanes in stable mixture with an alkylsulfate of benzimidazole where a portion of the lactone used to solubilize the alkylsulfate of benzimidazole is consumed in the method. The product of the method is an amide-functional polysiloxane in stable admixture with an alkylsulfate of benzimidazole. The product of the method may be used to treat textiles, particularly cotton and cotton-synthetic fiber blends, to provide good softness and water absorbency and improved whiteness and durability compared to those compositions described in the above cited art

SUMMARY OF INVENTION

The present invention is a method for forming a fiber treating composition comprising contacting an aminofunctional polysiloxane comprising at least one aminofunctional siloxy unit with a mixture comprising a lactone and an alkylsulfate of benzimidazole thereby effecting formation of an amide-functional polysiloxane in admixture with the alkylsulfate of benzimidazole. The composition formed by the method is particularly useful for treating textiles such as cotton and cotton-synthetic blends to provide good softness and water absorbency and improved whiteness and treatment durability.

DESCRIPTION OF INVENTION

The present invention is a method for forming a fiber treating composition comprising contacting an aminofunctional polysiloxane comprising at least one aminofunctional siloxy unit described by formula

$$R^1{}_a(R^3R^8NR^2)_b SiO_{(4-a-b)/2} \qquad (1)$$

and siloxy units described by formula

$$R^1{}_c SiO_{(4-c)/2} \qquad (2)$$

with a mixture comprising a lactone described by formula

$$C(O)(CHR^4)_n O \qquad (3)$$

and an alkylsulfate of benzimidazole described by formula (4)

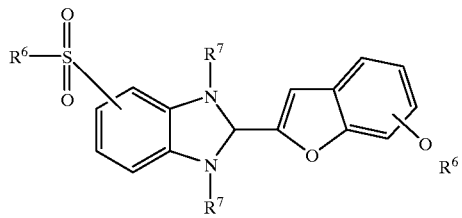

thereby effecting formation of an amide-functional polysiloxane in admixture with the alkylsulfate of benzimidazole; where each $R^1$ is independently selected from the group consisting of OH, $R^5$, $OR^5$, and $C(O)OR^5$; each $R^2$ is an independently selected divalent hydrocarbon radical; each $R^3$ is independently selected from the group consisting of hydrogen, —$R^2NHR^8$, and —$R^2NR^2$ $R^8NHR^8$ where $R^2$ is as previously described; each $R^4$ is independently selected from the group consisting of hydrogen, hydroxyl, monovalent hydrocarbon radicals comprising 1 to about 7 carbon atoms, and hydroxyl substituted hydrocarbon radicals comprising 1 to about 7 carbon atoms; each $R^5$ is an independently selected monovalent hydrocarbon radical comprising 1 to about 20 carbon atoms; each $R^6$ is an independently selected allyl radical comprising 1 to about 6 carbon atoms; each $R^7$ is independently selected from the group consisting of hydrogen atom and monovalent hydrocarbon radicals comprising 1 to about 12 carbon atoms, each $R^8$ is independently selected from the group consisting of hydrogen and monovalent hydrocarbon radicals comprising 1 to about 6 carbon atoms; a=0, 1, or 2; b=1 or 2; a+b=1, 2, or 3; c=0, 1, 2, or 3; and n=2 to 7.

The aminofunctional polysiloxane of the present method comprises at least one aminofunctional siloxy unit described by formula (1) and siloxy units described by formula (2). Examples of such aminofunctional polysiloxanes and methods for their preparation are described in Cray et al., U.S. Pat. No. 5,100,991, which is incorporated herein by reference for such teachings. Preferably the aminofunctional polysiloxane is a substantially linear polydiorganosiloxane, although small amounts of units which cause branching of the siloxane are possible. In formulas (1) and (2) each of the substituents represented by $R^1$ can be independently selected from the group consisting of OH, $R^5$, $OR^5$, and $C(O)OR^5$. When $R^1$ is in a pendant position on the aminofunctional polysiloxane it is preferred that $R^1$ be $R^5$, where $R^5$ is an independently selected monovalent hydrocarbon radical comprising 1 to about 7 carbon atoms. $R^5$ can be, for example, an allyl such as methyl, ethyl, and, hexyl; an alkenyl such as vinyl and allyl; and an aryl such as phenyl and tolyl. When $R^1$ is in a pendant position on the aminofunctional polysiloxane it is preferred that $R^1$ be an alkyl comprising 1 to about 7 carbon atoms and more preferably methyl. When the aminofunctional polysiloxane is terminated with an aminofunctional siloxy unit represented by formula (1) or a siloxy unit as described by formula (2), it is preferred that at least one of the $R^1$ substituents be a hydrolyzable group as represented by OH, $OR^5$, and $C(O)OR^5$, where $R^5$ is as previously described. The preferred hydrolyzable group in such aminofunctional polysiloxanes is an alkoxy group as represented by formula $OR^5$ where $R^5$ is as previously described, with methoxy and ethoxy being most preferred.

In formula (1), $R^2$ is an independently selected divalent hydrocarbon radical. Preferred is when $R^2$ is an alkylene radical, for example, methylene, ethylene, propylene, isobutylene, and hexylene. In formula (1), each $R^3$ is independently selected from the group consisting of hydrogen, $-R^2NHR^8$, and $-R^2NR^2R^8NHR^8$ where $R^2$ and $R^8$ are as previously described. $R^8$ can be, for example, hydrogen, methyl, ethyl, tert-butyl, and phenyl. Preferred is when $R^8$ is hydrogen. Examples of aminofunctional groups bonded to the silicon atom of the aminofunctional siloxy unit described by formula (1) include $-(CH_2)_3NH_2$, $-CH_2CH(CH_3)CH_2NH_2$, $-CH_2CH(CH_3)CH_2NH(CH_2)_2NH_2$, $-(CH_2)_3NH(CH_2)_3NH(CH_2)_3NH_2$, $-(CH_2)_3NH(CH_2)_2NH_2$, and $-(CH_2)_3NH(CH_2)_2NH(CH_2)_2NH_2$, $-(CH_2)_3N(CH_3)H$, $-(CH_2)_3N(CH_3)(CH_2)_3NH(CH_2)_3NH_2$, and $-(CH_2)_3N(CH_3)(CH_2)_2N(CH_3)H$. A preferred primary aminofunctional group bonded to the silicon atom is $-CH_2CH(CH_3)CH_2NH(CH_2)_2NH_2$.

In formula (1), a+b=1, 2, or 3 which means that the aminofunctional siloxy unit can be located within the polysiloxane chain, terminally, or both. Preferred is when a+b=2 or 3. In formula (2), c=0, 1, 2, or 3 which means that the siloxy unit described by formula (2) can be located within the siloxane chain, terminally, or both. Preferred is when c=2 or 3.

In the present method the aminofunctional polysiloxane should be a liquid under the conditions at which it is contacted with the mixture comprising the lactone and alkylsulfate of benzimidazole. It is preferred that the aminofunctional polysiloxane have a viscosity at 25° C. of less than about 1000 mPa·s. More preferred is when the aminofunctional polysiloxane has a viscosity within a range of about 50 to 500 mPa·s at 25° C. Most preferred is when the aminofunctional polysiloxane has a viscosity within a range of about 100 to 250 mPa·s at 25° C. In the present method it is preferred that the aminofunctional polysiloxane comprise about 0.1 to 20 mole percent of the aminofunctional siloxy units described by formula (1) and preferably about 1 to 10 mole percent. Even more preferred is when the aminofunctional polysiloxane comprises about 1 to 4 mole percent of the aminofunctional siloxy units described by formula (1).

Lactones suitable for use in the present method are those described by formula (3). Preferred lactones described by formula (3) are those in which each $R^4$ represents a hydrogen atom and n has a value of 3, 4, 5, or 6, for example, gamma-butyrolactone and epsilon-caprolactone. Gamma-butyrolactone is most preferred for use in the present method. The amount of lactone added to the present method is not critical and will depend upon the moles of amino functionality substituted on the aminofunctional polysiloxane, the amount of such functionality it is desired to acetylate with the lactone, and the solubility of the alkylsulfate of benzimidazole in the lactone. Generally it is preferred that the lactone be added in an amount sufficient to react with about 30 to 70 mole percent of the amine functionality on the aminofunctional polysiloxane to form amide bonds. More preferred is when the lactone is added in an amount such that 50 to 60 mole percent of the amine groups are reacted with the lactone to form an amide bond. When more than about 70 percent of the primary amine functionality on the aminofunctional polysiloxane is reacted, the deterioration of the softening effect of the composition of the present method may occur. Generally, about 0.5 to 10 weight percent of the lactone may be added to the method based upon the weight of the aminofunctional polysiloxane, with about 1 to 5 weight percent being preferred.

A mixture comprising lactone as described above and an alkylsulfate of benzimidazole (herein after in the alternative referred to as benzimidazole) as described by formula (4) is used in the present method. In formula (4), each $R^6$ is an independently selected alkyl radical comprising 1 to about 6 carbon atoms. $R^6$ can be, for example, methyl, ethyl, propyl, and tert-butyl, with methyl being preferred. In formula (4), each $R^7$ is independently selected from the group consisting of hydrogen atom and monovalent hydrocarbon radicals comprising 1 to about 12 carbon atoms. $R^7$ can be, for example, alkyls, cycloalkyls, alkenyls, aryls, and aralkyls. $R^7$ can be, for example, methyl, ethyl, propyl, tert-butyl, cyclopentyl, cyclohexyl, vinyl, allyl, phenyl, and benzyl. It is preferred that $R^7$ be methyl. The alkylsulfate of benzimidazoles of the present method are well known in the art and may be prepared by such methods as described in Wehling et al., U.S. Pat. No. 4,268,670, which is hereby incorporated by reference. A preferred alkylsulfate of benzimidazole for use in the present method is 1H-benzimidazolium, 2-(6-methoxy-2-benzofuranyl)-1,3-dimethyl-5-(methylsulfonyl)-, methyl sulfate.

If desired, a surfactant such as nonylphenol ethoxylate may be added to the mixture to facilitate solubilizing the benzimidazole in the lactone. The benzimidazole functions as an optical whitener in the composition prepared by the present method. The present inventor has unexpectedly discovered that by having the benzimidazole present in the mixture during acylation of the amine functionality of the polysiloxane with the lactone, that improved solubility of the benzimidazole in the resulting composition is achieved.

The amount of the alkylsufate of benzimidazole added to the lactone can be any amount which can be solubilized in the lactone. Generally, the benzimidazole can comprise up to about 20 weight percent of the mixture of the benzimidazole and the lactone. Preferably the benzimidazole can comprise about 5 to 10 weight percent of the mixture. Those skilled in the art will recognize that the amount of the benzimidazole in the mixture can be varied to provide for a desired level in the composition resulting from the present method, such that the optical brightner properties of the benzimidazole are exhibited when the composition is used to treat fibers.

The method of contacting the aminofunctional polysiloxane with the mixture comprising the lactone and alkylsulfate of benzimidazole is not critical to the present method.

Generally, the aminofunctional polysiloxane can be contacted with the mixture at any temperature at which the rate of reaction of the amine functionality of the aminofunctional polysiloxane with the lactone is at a satisfactory rate. It is preferred that the temperature of contact be at least about 15° C. More preferred is a contact temperature from about 20° C. up to the reflux temperature of the mixture of the aminofunctional polysiloxane with the mixture comprising the lactone and alkylsulfate of benzimidazole. Even more preferred is a contact temperature within a range of about 20° C. to 50° C.

The compositions prepared by the present method are especially suited for treating fibrous materials to provide such materials with good softness, hydrophilicity, and whiteness. The application of the compositions to such fibers may be done in any convenient way. Application methods which are suitable include padding, dipping, and spraying of a composition comprising the composition made by the present method. The compositions of the present method may be used in any suitable form including solutions, dispersions, and emulsions. The dispersions may be in aqueous or solvent based materials and preferably an oil-in-water type emulsion. Such emulsions may contain surfactants such as sulfates of higher alcohols, alkylbenzenesulfonates, higher alcohol polyoxyalkylene adducts, higher fatty acid polyoxyalkylene adducts, alkylphenol polyoxyalkylene adducts, higher fatty acid sorbitan esters, and ethoxylated branched and linear alcohols.

The compositions prepared by the present method are suitable for the treatment of both naturally occurring fibers such as cotton, wool, silk, and linen; regenerated fibers such as rayon and acetate; and synthetic fibers such as polyester, polyamide, spandex, polyester fibers, and blends of cotton and polyesters fibers. The compositions prepared by the present method are particularly useful for treatment of cotton fibers, and blends of cotton and regenerated or synthetic fibers. The application of the compositions prepared by the present method may be done at the stage of making the fibers, at the stage of producing fabrics from the fibers, or in a subsequent treating step. Fibrous materials and textiles which are treated with the compositions of the present method have good softness and absorbency and improved whiteness and durability of the treatment.

The following examples are provided to illustrate the present invention. These examples are not intended to limit the scope of the claims herein. Polysiloxane fluid compositions were prepared as described in Table 1. A 20 Wt. % aqueous emulsion of each of the polysiloxane fluid compositions was prepared by standard methods having the final composition described in Table 2. The emulsions described in Table 2 were pad applied to 100 percent cotton knit fabric having a wet weight pick-up of about 81 Wt. %, resulting in a 1 Wt. % polysilicone solids deposit on the dried fabric. The treated cotton fabric was dried in a forced air oven at 150° C. for 3 minutes. The treated fabrics were allowed to sit over night and then evaluated for the physical characteristics of whiteness, absorbency, and hand. The Whiteness Index was determined using a colorimeter to measure reflectance of light off the fabric; Absorbency was measure as the amount of time required for a drop of distilled water to absorb into the cotton fabric; and Hand was rated on a scale of 1 to 4, with 1=best and 4=worst. The results of this evaluation are described in Table 3.

TABLE 1

Description of Polysiloxane Fluid Compositions Tested

| Fluid No. | Fluid Composition |
|---|---|
| 1 | mixture comprising 10 Wt. % trimethylsiloxy endblocked polydimethylsiloxane fluid and 90 Wt.% trimethylsiloxy endblocked, dimethyl, methyl(aminoethylaminoisobutyl)siloxane, the mixture having a viscosity of 130 mPa · s at 25° C. |
| 2 | Fluid No. 1 reacted overnight at room temperature with 3.2 Wt. % butyrolactone having a viscosity after reaction of about 1000 mPa · s at 25° C. and being clear in color |
| 3 | Fluid No. 1 reacted overnight at room temperature with 10 Wt. % Uvitex ® ABW, a product of Ciba Specialty Chemicals Corporation, High Point, NC, comprising 32 Wt. % butyrolactone, 5–10 Wt. % alkylsulfate salt of benzimidazole, and 4–6 Wt. % nonylphenol ethoxylate. The resulting mixture was clear in color and had a viscosity of about 13,000 mPa · s at 25° C. |
| 4 | Fluid No. 1 reacted overnight at room temperature with 0.1 Wt. % Tinopal ® CBS-X a product of Ciba Specialty Chemicals Corporation, High Point, NC comprising 89–91 Wt. % distyryl biphenyl derivative and 6–8 Wt. % sodium chloride. |
| 5 | methyl(aminoisobutyl)ethoxysiloxy endblocked, dimethyl, methyl(aminoisobutyl)siloxane having a viscosity of about 800 mPa · s at 25 ° C. with 2 Wt. % Uvitex ABW. The resulting mixture was a clear highly viscous liquid. |

TABLE 2

| | Emulsion Compositions Composition Label (Wt.% Component) | | | | |
|---|---|---|---|---|---|
| Component | A | B | C | D | E |
| Fluid 1 | 20 | — | — | — | — |
| Fluid 2 | — | 20 | — | — | — |
| Fluid 3 | — | — | 20 | — | — |
| Fluid 4 | — | — | — | 20 | — |
| Fluid 5 | — | — | — | — | 20 |
| Genapol ® UD079* | — | — | — | — | 4 |
| Genapol ® UD050* | 3 | 3 | 3 | 3 | — |
| Genapol ®UD110* | 7 | 7 | 7 | 7 | 3 |
| Acetic Acid, Glacial | 0.4 | 0.4 | 0.4 | 0.4 | 0.3 |
| Water | 69.6 | 69.6 | 69.6 | 69.6 | 68.7 |

*Ethoxylated C11 branched and linear alcohols, product of Hoechst Celanese, Charlotte, NC

TABLE 3

| | Effects of Treatment | | |
|---|---|---|---|
| Composition Label | Whiteness Index | Absorbency (Seconds) | Hand |
| Control** | 70 | <1 | 4 |
| A | 67 | 4.6 | 1 |
| B | 6g | 2.0 | 2 |
| C | 99 | 2.0 | 2 |
| D | 77 | 3.9 | 2 |
| E | 90 | >60 | 2 |

**Untreated cotton fabric

I claim:

1. A method for forming a fiber treating composition comprising contacting an aminofunctional polysiloxane comprising at least one aminofunctional siloxy unit described by formula $$R^1{}_a(R^3R^8NR^2)_bSiO_{(4-a-b)/2}$$ and siloxy units described by formula $R^1_c SiO_{(4-c)/2}$ with a mixture comprising a lactone described by formula $C(O)(CHR^4)_nO$ and an alkylsulfate of benzimidazole described by formula

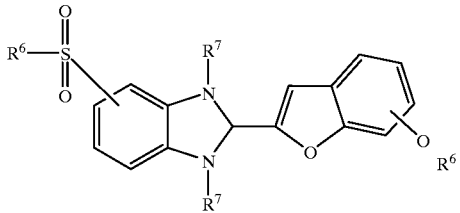

thereby effecting formation of an amide-functional polysiloxane in admixture with the alkylsulfate of benzimidazole; where each $R^1$ is independently selected from the group consisting of OH, $R^5$, $OR^5$, and $C(O)OR^5$; each $R^2$ is an independently selected divalent hydrocarbon radical; each $R^3$ is independently selected from the group consisting of hydrogen, $-R^2NHR^8$, and $-R^2NR^2R^8NHR^8$ where $R^2$ is as previously described; each $R^4$ is independently selected from the group consisting of hydrogen and monovalent hydrocarbon radicals comprising 1 to about 7 carbon atoms; each $R^5$ is an independently selected monovalent hydrocarbon radical comprising 1 to about 20 carbon atoms, each $R^6$ is an independently selected alkyl radical comprising 1 to about 6 carbon atoms, each $R^7$ is independently selected from the group consisting of hydrogen and monovalent hydrocarbon radicals comprising 1 to about 12 carbon atoms, each $R^8$ is independently selected from the group consisting of hydrogen and monovalent hydrocarbon radicals comprising 1 to about 6 carbon atoms; a=0, 1, or 2; b=1 or 2; a+b=1, 2, or 3; c=0, 1, 2, or 3; and n=2 to 7.

2. A method according to claim 1, where $R^1$ is an alkyl group comprising 1 to about 7 carbon atoms in a pendant position on the aminofunctional polysiloxane.

3. A method according to claim 1, where $R^1$ is a methyl group in a pendant position on the aminofunctional polysiloxane.

4. A method according to claim 1, where $R^2$ is an alkylene radical.

5. A method according to claim 1, where $R^8$ is hydrogen.

6. A method according to claim 1, where the aminofunctional siloxy unit comprises $-CH_2CH(CH_3)CH_2NH(CH_2)_2NH_2$ bonded to silicon.

7. A method according to claim 1, where the aminofunctional polysiloxane has a viscosity within a range of about 50 to 500 mPa·s at 25° C.

8. A method according to claim 1, where the aminofunctional polysiloxane has a viscosity within a range of about 100 to 250 mPa·s at 25° C.

9. A method according to claim 1, where the aminofunctional polysiloxane comprises about 0.1 to 20 mole percent of the aminofunctional siloxy units.

10. A method according to claim 1, where the aminofunctional polysiloxane comprises about 1 to 4 mole percent of the aminofunctional siloxy units.

11. A method according to claim 1, where the aminofunctional polysiloxane has a viscosity within a range of about 100 to 250 mPa·s at 25° C. and comprises 1 to 4 mole percent of the aminofunctional siloxy units.

12. A method according to claim 1, where $R^4$ is a hydrogen atom and n has a value of 3, 4, 5, or 6.

13. A method according to claim 1, where the lactone is gamma-butyrolactone.

14. A method according to claim 1, where the mixture comprises about 0.5 to 10 weight percent of the lactone based on the weight of the aminofunctional polysiloxane.

15. A method according to claim 1, where the mixture comprises about 1 to 5 weight percent of the lactone based on the weight of the aminofunctional polysiloxane.

16. A method according to claim 1, where the alkylsulfate of benzimidazole is 1H-benzimidazolium, 2-(6-methoxy-2-benzofuranyl)-1,3-dimethyl-5-(methylsulfonyl)-methyl sulfate.

17. A method according to claim 1, where the mixture comprising the lactone and the alkylsulfate of benzimidazole comprises about 5 to 10 weight percent of the alkylsulfate of benzimidazole.

18. A method according to claim 1, where the lactone is gamma-butyrolactone and the alkylsulfate of benzimidazole is 1H-benzimidazolium, 2-(6-methoxy-2-benzofuranyl)-1,3-dimethyl-5-(methylsulfonyl)-methyl sulfate.

19. A method according to claim 18, where the aminofunctional polysiloxane is trimethylsiloxy endblocked dimethyl, methyl(aminoethylaminoisobutyl)siloxane.

20. A method according to claim 18, where the aminofunctional polysiloxane is methyl(aminoisobutyl) ethoxysiloxy endblocked, dimethylsiloxy, methyl(aminoisobutyl)siloxane.

* * * * *